Patented Jan. 19, 1932

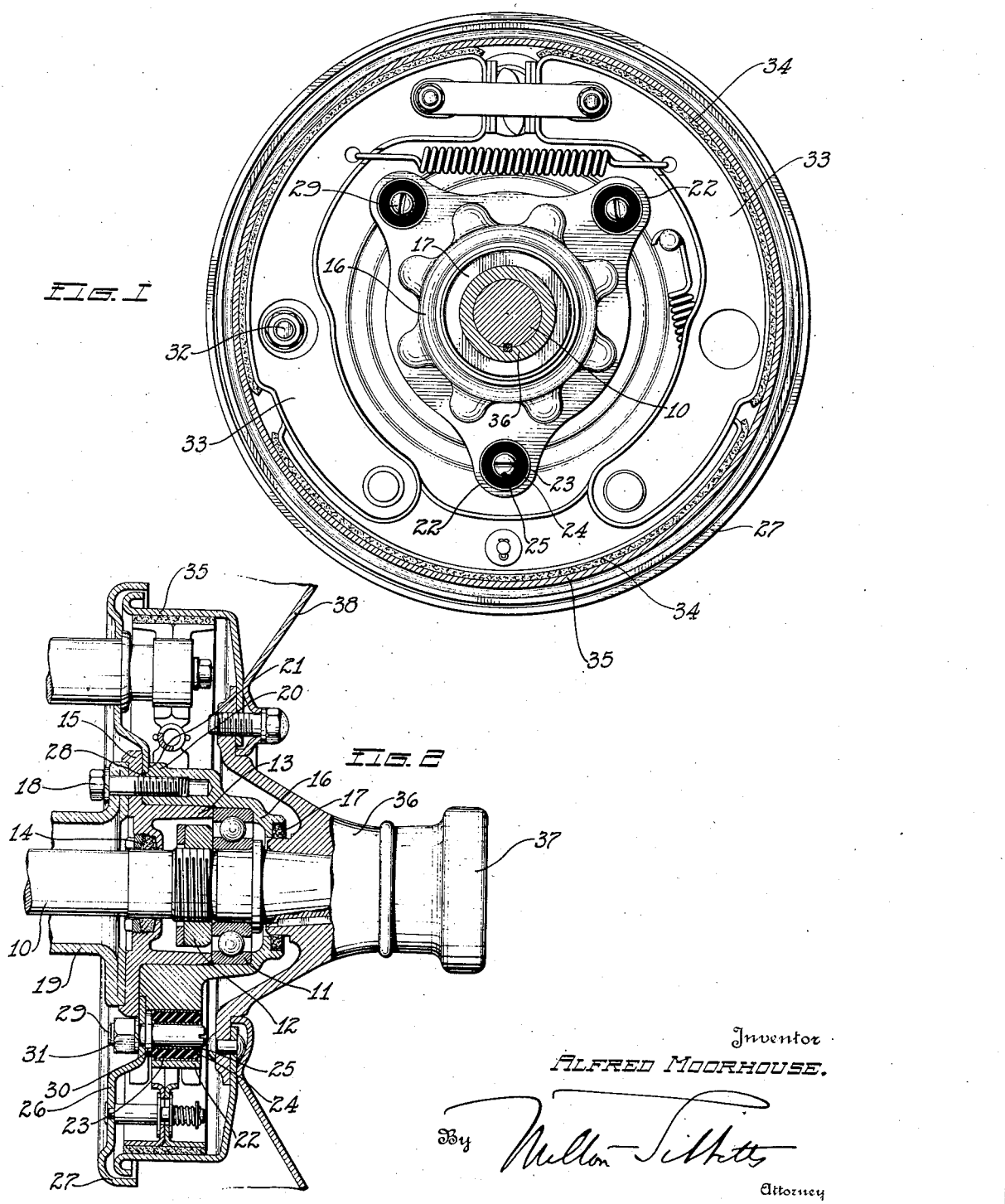

1,841,415

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

BRAKE MECHANISM

Application filed October 10, 1927. Serial No. 225,049.

This invention relates to motor vehicles and more particularly to brakes thereof.

Heretofore various means have been employed in efforts tending toward the elimination of squeak or tone vibrations encountered in the use of motor vehicle brakes of the various types now employed. Such efforts have been directed principally to modifying the brake shoes and the brake bands or linings and the results obtained have not proved entirely satisfactory.

In brake structures comprising a brake support plate having brake shoes anchored thereon for cooperation with a brake drum, there is set up, when the brakes are applied, tone vibrations in both the brake support plate and brake drum resulting in a disagreeable squeak. These tone vibrations are caused by the spasmodic co-action between the shoes and the brake drum. This sudden and irregular gripping action between the shoes and the drum is intensified under various conditions resulting in the building up of tone vibrations of considerable amplitude. It is the aim of the present invention to reduce or eliminate these tone vibrations or squeaks.

An object of the invention is to provide a mounting for the brake support plate which will reduce or eliminate the squeak common to brakes now in general use.

Another object of the invention is to provide a brake support plate connected by a resilient means to an axle of a motor vehicle.

Another object of the invention is to provide a brake support plate cushioned upon a stationary axle of a motor vehicle in a manner to reduce or eliminate vibration that would otherwise be transmitted thereto.

Another object of the invention is to provide a brake support plate connected by a plurality of resilient members to a stationary axle so as to absorb vibrations which would otherwise produce disagreeable noises.

A further object of the invention is to provide a brake support plate with means for dampening the tone vibrations in the brake support plate and the associated parts of the brake.

A further object of the invention is to provide a brake support plate mounted upon a stationary axle and adapted to rotate thereupon and having an interconnected means for restricting the rotation of the plate upon the axle, the said interconnected means being of a character to damp vibration that would otherwise be set up in the braking mechanism.

A further object of the invention is to provide a brake support plate connected to a stationary axle by a plurality of resilient or cushioned members each comprising a bushing of rubber or other suitable material encased between two sleeves of different diameter, the outer sleeve being suitably connected to a stationary axle and the inner sleeve connected by suitable means to the brake support plate.

Still a further object of the invention is to provide a brake support plate and means for mounting the same, having the advantages of a positive check or damping action on tone vibrations, is highly efficient in operation and yet of marked simplicity as a whole and in respect to each of its component parts and their assembly.

Other objects of the invention will appear from the following description taken in connection with the drawings, which form a part of this specification, and in which:

Figure 1 is an enlarged plan view of a brake illustrating the rear axle shaft bearing sleeve mounted on a rear axle and equipped with the invention, and Figure 2 is a vertical sectional view of a portion of a rear axle and brake illustrating the invention as applied.

Referring by numerals to the drawings 10 represents a portion of the rear axle of a motor vehicle, having mounted thereupon a bearing 11 secured in position by a check nut 12 and a retainer 13, the retainer having the usual retainer washer and washer nut as indicated at 14 and a radial flange 15. A bearing sleeve 16 is fitted over the bearing 11 and retainer 13 and provided with the usual dust washer and dust washer retainer indicated at 17. The bearing sleeve 16 abuts the flange 15 upon the retainer 13 and is provided with a plurality of threaded apertures registering with apertures in the flange 15 for the reception of bolts 18, by means of which the sleeve 16 is secured to an axle housing 19, with the flange 15 of the retainer clamped therebetween.

The bearing sleeve 16 is provided with a radial shoulder and a reduced end portion 20 which together with the radial flange 15 on the retainer provides a circumferential slot 21, the object of which will hereinafter appear. The bearing sleeve is further provided with a plurality of lobes 22 each adapted to receive a sleeve 23 in which is mounted a rubber or other resilient bushing 24 having an inner metallic sleeve 25. These bushings with their outer and inner sleeves constitute resilient or cushion members for mounting a brake support plate 26. As shown, the brake support plate 26 comprises a plate having a peripheral flange 27 and a central opening 28, the opening 28 receiving the reduced end portion 20 of the bearing sleeve 16. The plate is mounted to rotate in the circumferential groove 21 formed by the reduced end portion, the radial shoulder on the bearing sleeve and the radial flange on the retainer.

The plate 26 is provided with a plurality of apertures arranged adjacent the central opening 28 in spaced relation thereto and to each other. These apertures receive stud bolts 29 each having a radial flange 30 and a nut 31 by means of which the bolts are clamped to the plate 26. The bolts 29 extend normal from the plate 26 and engage the inner sleeves 25, in the bushings 24, the radial flanges 30 on the bolts abutting the bushings. In the structure shown, the plate 26 is mounted to revolve on the sleeve 16 and is restrained in its movement by the resilient bushings 24. The support plate 26 is provided with a stud 32 upon which are anchored suitable brake shoes 33 having linings 34 adapted to engage a brake drum 35 carried by a wheel hub 36, the hub being suitably secured upon the axle and provided with a hub cap 37, and having mounted thereupon a wheel 38 only a portion of which is shown.

While I have herein described in some detail specific embodiments of my invention, which I deem to be new and advantageous and may specifically claim, I do not desire it to be understood that my invention is limited to the exact details of the construction, as it will be apparent that changes may be made therein without departing from the spirit or scope of my invention.

Having thus described the invention, what I claim as new and desire to secure by Letters Patent, is:

1. In a motor vehicle, the combination of a stationary axle, a wheel mounted for rotation relative thereto, a brake drum carried by said wheel, a brake support plate, brake shoes on said plate for cooperation with said drum, means connecting the plate to the axle for relative rotation thereto and a compression member restraining the rotary movement of the plate in either direction from a position in which the brake is released.

2. In a motor vehicle, the combination of a stationary axle, a wheel mounted for rotation relative thereto, a brake drum carried by said wheel, a brake support plate, brake shoes on said plate for cooperation with said drum, brake applying connections for said shoes, means supporting the plate upon the axle for relative rotation and rubber compression members restraining the rotation of said plate in either direction.

3. In a motor vehicle, the combination with an axle having a bearing and a bearing retainer, of a sleeve for said bearing having a plurality of apertures, resilient members in said apertures, a brake support plate and means on said plate for attachment to said resilient members.

4. In a motor vehicle, the combination with an axle having a bearing thereon, a retainer for said bearing, of a bearing sleeve having a plurality of radial lobes provided with apertures, resilient members mounted in the apertures, a brake support plate and means upon said plate for engaging said resilient members.

5. In a motor vehicle, in combination with an axle having a bearing thereon and a retainer for the bearing, of a bearing sleeve having radial lobes provided with apertures parallel to the axis of the axle, resilient members in the apertures, a brake support plate and studs upon said support plate engaging said members.

6. In a motor vehicle, a brake mechanism comprising a brake support plate, a wheel mounted to rotate relative to the brake support plate, a brake drum carried by said wheel, brake shoes upon the support plate for cooperation with said brake drum, said brake support plate mounted for rotation and rubber compression members restricting the rotation of the brake support plate in either direction, whereby spasmodic co-action between the brake shoes and the brake drum is prevented.

7. In a motor vehicle, a brake mechanism comprising a brake support plate, a wheel mounted for rotation relative thereto, a brake drum carried by said wheel, brake shoes anchored upon said support plate, means for actuating the brake shoes for cooperation with the brake drum, means mounting the brake support plate for rotation and rubber compression members for restricting the rotation of the plate in either direction, whereby sudden and irregular co-action between the brake shoes and the brake drum is prevented.

8. In a motor vehicle, a brake mechanism comprising a brake support plate mounted for rotation, a wheel mounted for rotation relative thereto, a brake drum carried by said wheel, brakes mounted on the brake support plate for cooperation with said drum and compression members for restricting the rotation of the brake support plate in either direction, whereby vibration in brake support plate, the brakes and the drum is prevented, said compression members being formed of rubber.

9. In a motor vehicle, a brake mechanism comprising a brake support plate mounted for rotation, a brake drum, brake shoes upon said support plate cooperating with said drum and compression means restricting the rotary movement of the brake support plate in either direction and absorbing vibrations caused by the spasmodic action between the brake shoes and the brake drum.

10. In a brake mechanism comprising an axle housing, a brake carrying plate, a bearing sleeve retaining said plate in axial relation with the housing, and a yieldable vibration dampening connection between the plate and the bearing sleeve.

11. In a brake mechanism comprising an axle housing, a brake carrying plate, a bearing sleeve retaining said plate in axial relation with the housing, and a rubber mounted connection between the plate and the bearing sleeve.

12. In a brake mechanism comprising an axle housing, a brake carrying plate, an apertured bearing sleeve fixed to retain said plate in a definite axial relation with the axle housing, rubber bearings secured in the apertures in the sleeve, and connections carried by the rubber bearings and engaging the plate, said bearings absorbing vibration and opposing rotary movement of the plate in either direction.

In testimony whereof I affix my signature.

ALFRED MOORHOUSE.